United States Patent [19]
Lanham

[11] Patent Number: 6,017,177
[45] Date of Patent: Jan. 25, 2000

[54] MULTI-TIER SECURITY FASTENER

[75] Inventor: Thomas R. Lanham, Boston, N.Y.

[73] Assignee: McGard, Inc., Orchard Park, N.Y.

[21] Appl. No.: 08/938,800

[22] Filed: Oct. 6, 1997

[51] Int. Cl.[7] .................................................. F16B 23/00
[52] U.S. Cl. ...................... 411/410; 411/402; 411/910; 81/121.1; 81/124.4; 81/451; 81/436
[58] Field of Search .................... 411/402, 403, 411/407, 410, 910; 81/121.1, 124.4, 451, 436

[56] References Cited

U.S. PATENT DOCUMENTS

| | | | |
|---|---|---|---|
| 1,458,956 | 6/1923 | Sayer | 81/121.1 |
| 3,519,979 | 7/1970 | Bodenstein | 81/121.1 |
| 3,888,144 | 6/1975 | Parsons | 81/436 |
| 4,170,918 | 10/1979 | Burge | 411/910 |
| 4,189,976 | 2/1980 | Becker | 411/410 |
| 4,258,596 | 3/1981 | Bisbing | 81/436 |
| 4,380,942 | 4/1983 | Fenton | 81/436 |
| 4,648,293 | 3/1987 | McCauley | 81/451 |
| 4,693,655 | 9/1987 | Omori | 411/910 |
| 4,805,495 | 2/1989 | Tauber | 81/124.4 |
| 4,897,008 | 1/1990 | Parks | 411/910 |
| 5,469,726 | 11/1995 | Rushing | 411/910 |

FOREIGN PATENT DOCUMENTS

| | | | |
|---|---|---|---|
| 763737 | 8/1951 | Germany | 411/403 |

*Primary Examiner*—Flemming Saether
*Attorney, Agent, or Firm*—Joseph P. Gastel

[57] ABSTRACT

A multi-tier security fastener in the nature of a nut or bolt having a body with a first tier having a lobed drive surface, and second and third cylindrical tiers on opposite sides of the first tier, with all three tiers having different effective diameters. The second and third cylindrical tiers can have irregularities in the nature of a lobe or a depression.

17 Claims, 5 Drawing Sheets

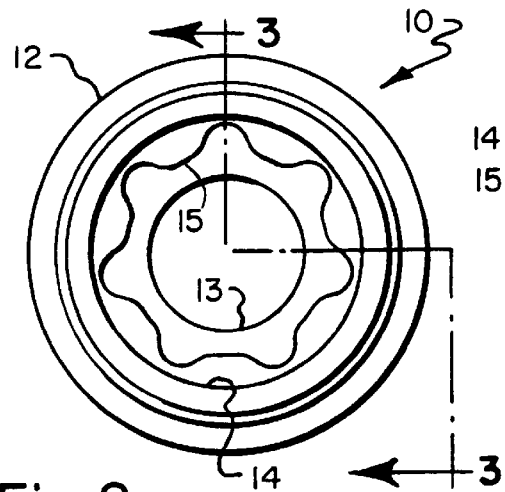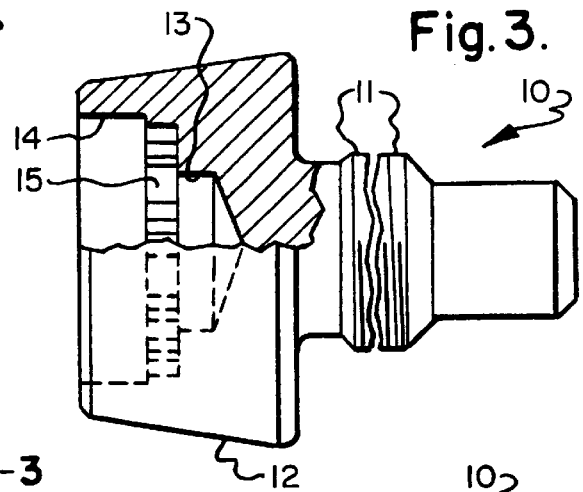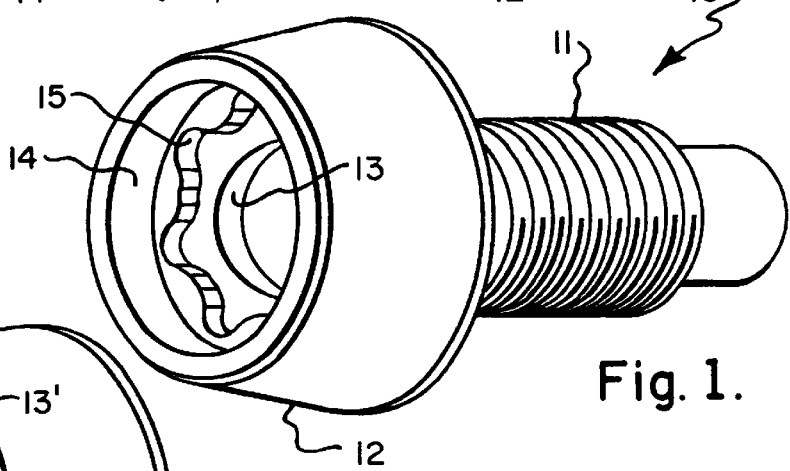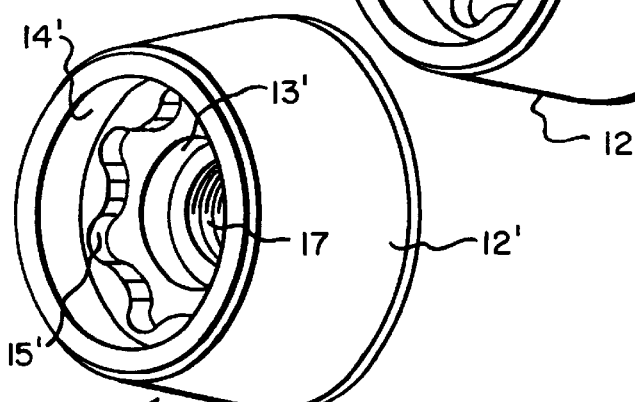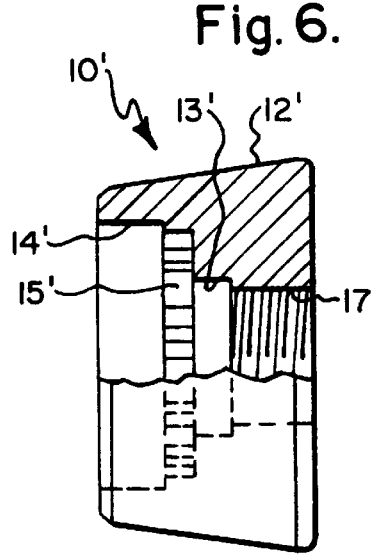

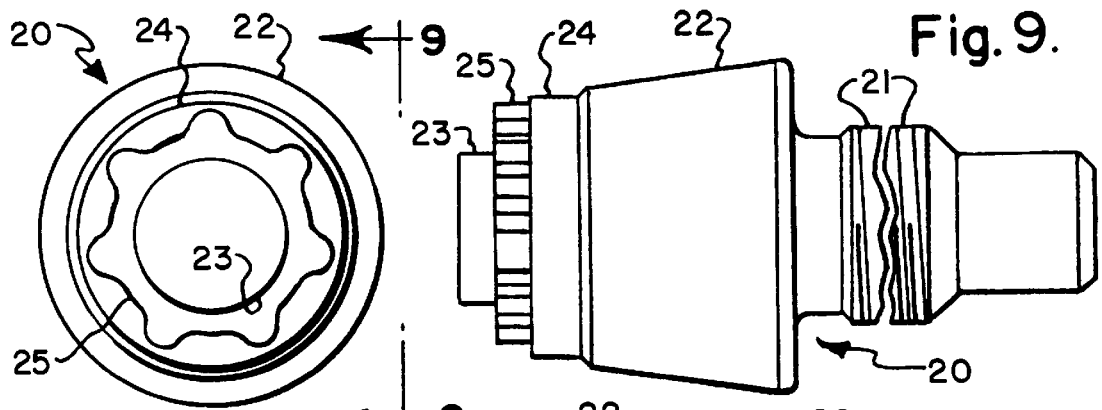
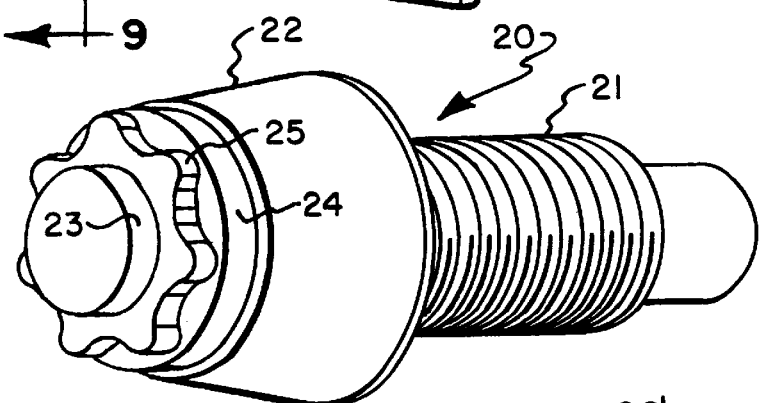
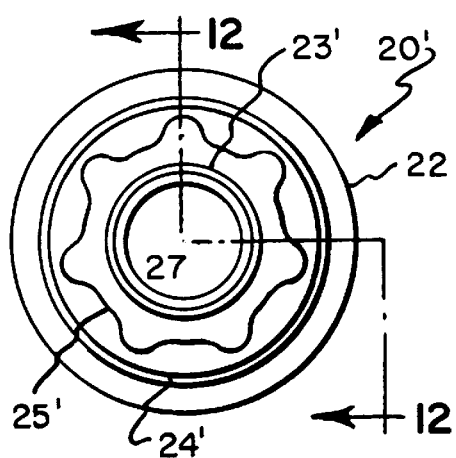
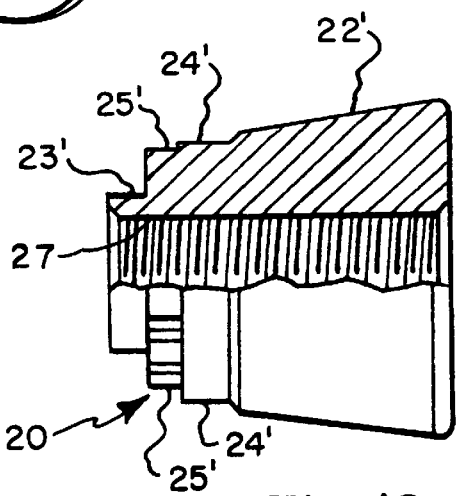
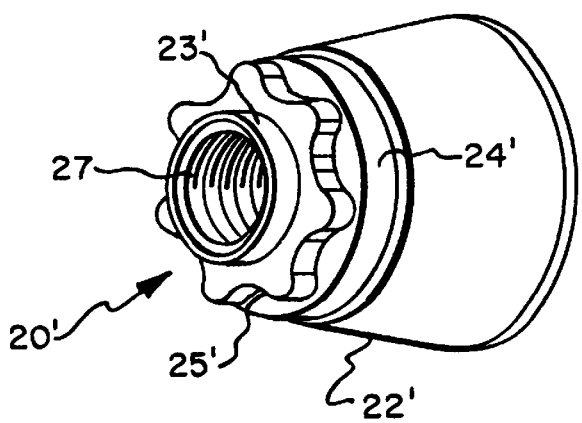

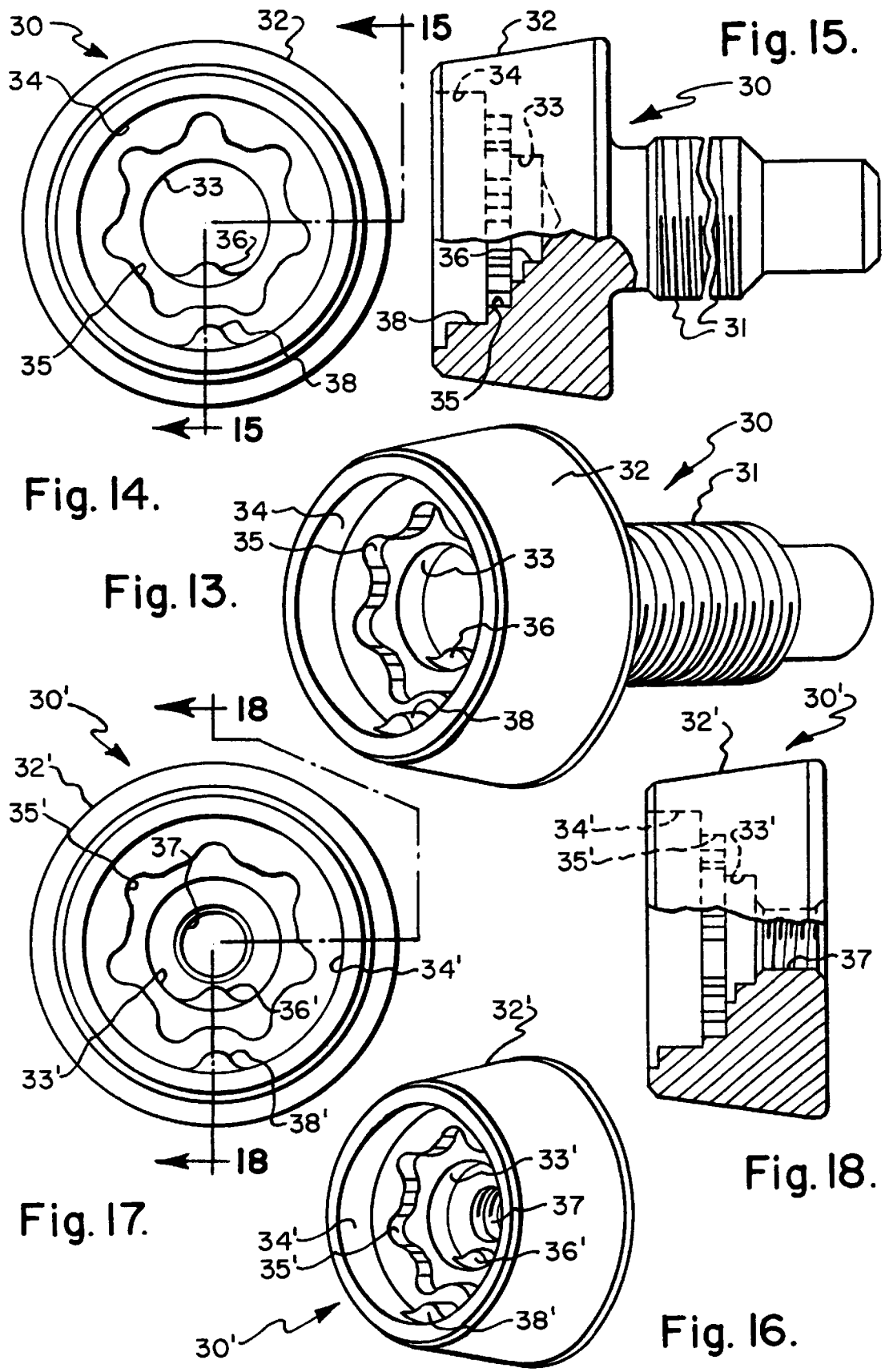

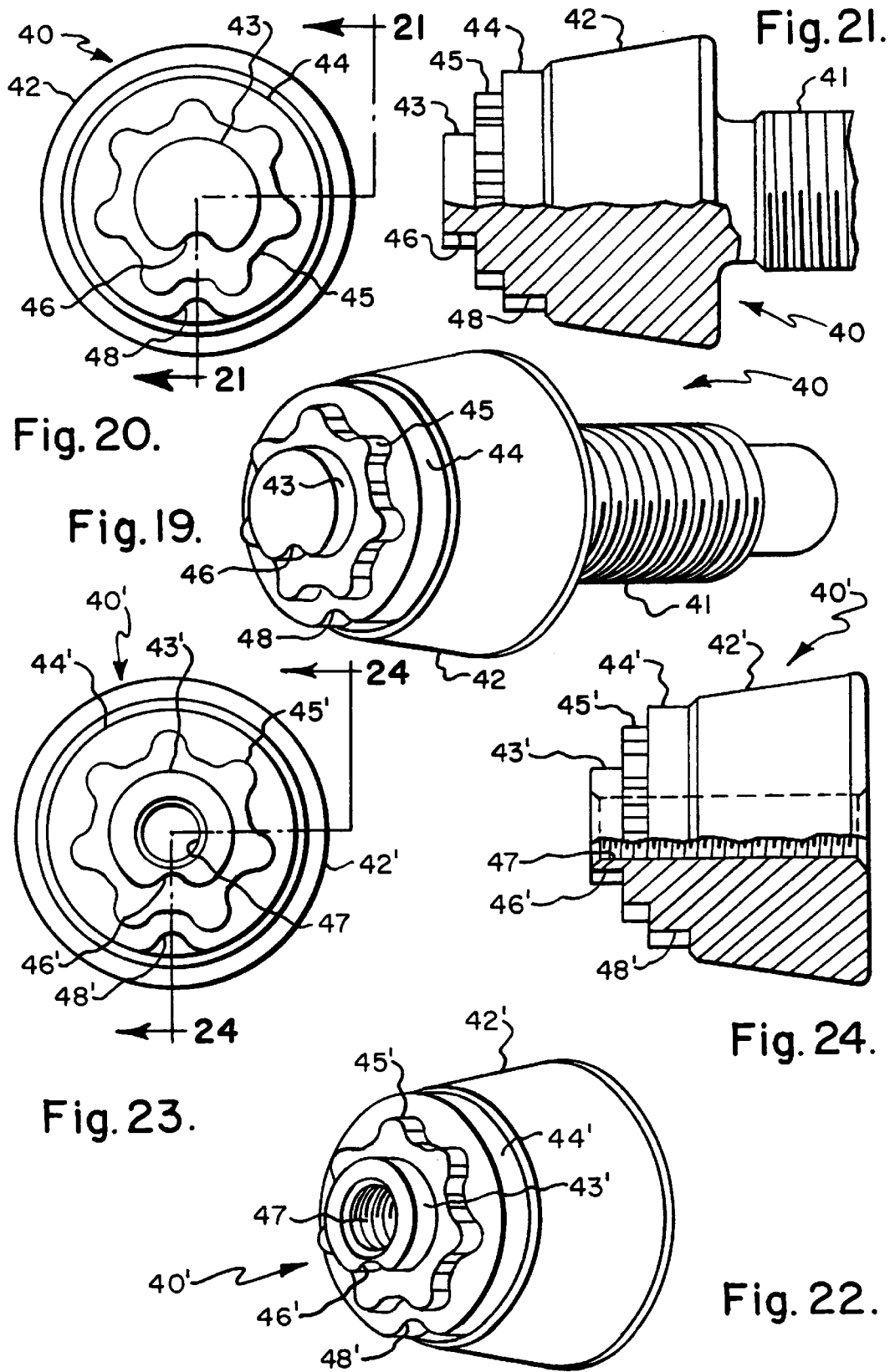

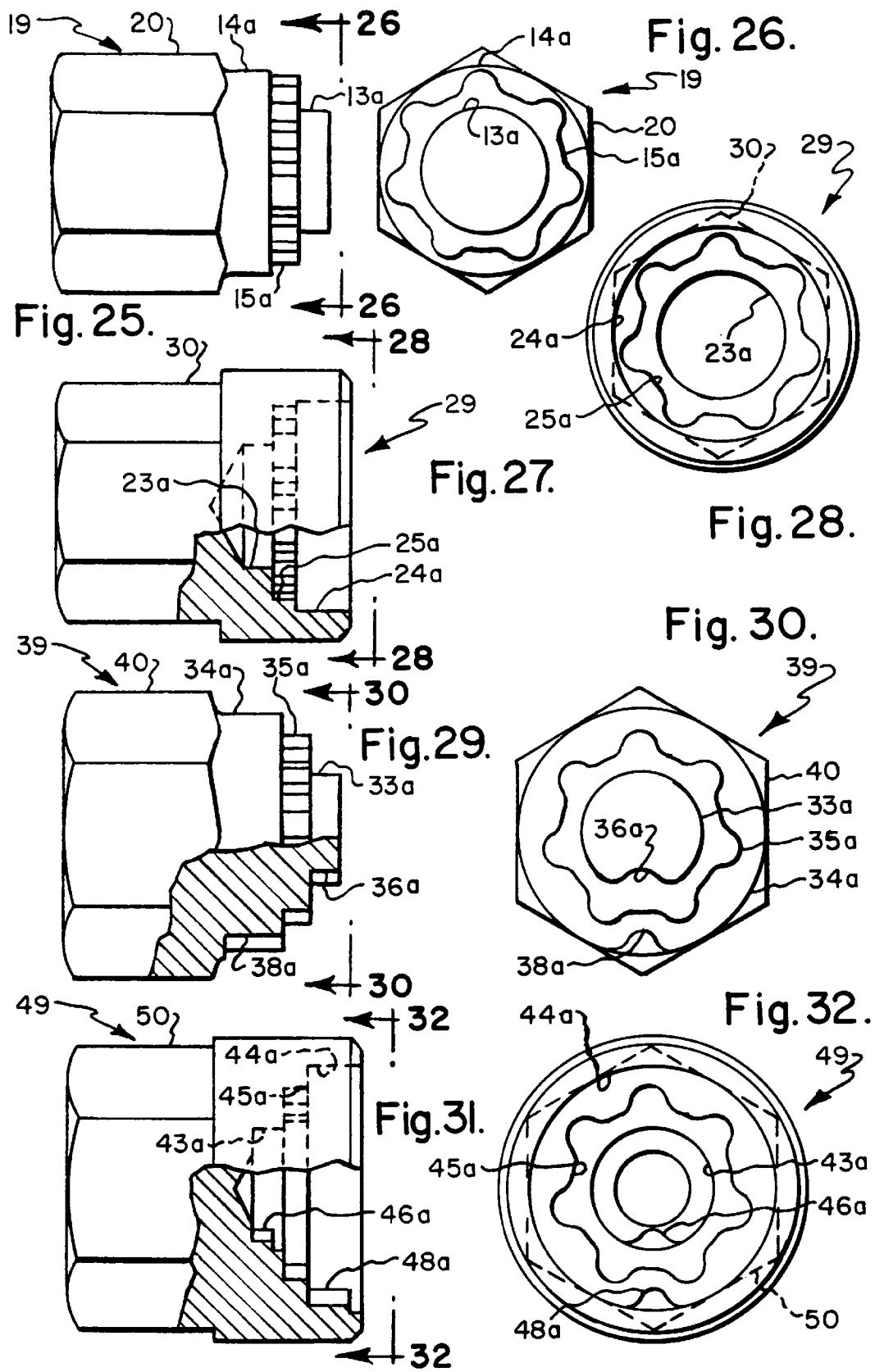

MULTI-TIER SECURITY FASTENER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to an improved security fastener having a multi-tier drive.

There are numerous types of security fasteners known. Many of these security fasteners include an undulating groove or ridge which receives a mating key. However, fasteners of these types require the groove or ridge to have sufficient axial length so as to provide a relatively large area of contact with a mating key which is required to turn them. The greater the axial length, the greater will be the ability of unauthorized tools to turn the fasteners. Additionally, fasteners having a relatively long axial length are fabricated by complex machining operations which increases their costs.

BRIEF SUMMARY OF THE INVENTION

It is one object of the present invention to provide a multi-tier drive for a security fastener, such as a nut or bolt, wherein each of the tiers has a different diameter and a relatively shallow axial length or depth, which does not provide sufficient axial surface for receiving an unauthorized tool in turning relationship.

Another object of the present invention is to provide an improved security fastener having a multi-tier drive wherein each of the tiers is of relatively shallow axial length and which is used with a multi-tier key which engages each of the tiers to provide a positive turning relationship with the multi-tier drive.

A further object of the present invention is to provide an improved security fastener having a multi-tier drive wherein one of the tiers is a drive tier utilized to receive the torque applied thereto by an appropriate key and one or more other tiers provide the dual function of guiding an associated key into turning relationship with the drive tier, and, when the key is in the proper turning relationship, also stabilize the key against cocking relative to the drive tier which receives the torque.

Yet another object of the present invention is to provide a fastener with a multi-tier drive which can be fabricated with a simple cold forming or forging operation.

A still further object of the present invention is to provide a security fastener having a multi-tier drive wherein the configuration of stabilizing tiers can be changed in practically infinite amounts to produce a practically infinite number of patterns in a relative simple manner.

Other objects and attendant advantages of the present invention will readily be perceived hereafter.

The present invention relates to a multi-tier security fastener comprising a body, a first tier on said body, a key-receiving drive pattern on said first tier, and second and third key-receiving tiers on said body adjacent said first tier.

The present invention also relates to a multi-tier security fastener comprising a body, a first tier on said body, a drive pattern on said first tier having a first diameter, a second tier on said body adjacent said first tier and having a second diameter which is different from said first diameter, a key-guiding and stabilizing surface on said second tier, and an irregularity in said second tier.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 1 is a perspective view of a bolt having the improved multi-tier security drive of the present invention;

FIG. 2 is an end elevational view of the fastener of FIG. 1;

FIG. 3 is a fragmentary cross sectional view taken substantially along line 3—3 of FIG. 2;

FIG. 4 is a perspective view of a nut having the improved security drive shown on the bolt of FIG. 1;

FIG. 5 is an end elevational view of the nut of FIG. 4;

FIG. 6 is a view, partially in cross section, taken substantially along line 6—6 of FIG. 5;

FIG. 7 is a perspective view of another bolt embodiment of t present invention having a male multi-tier security drive construction;

FIG. 8 is an end elevational view of the embodiment of FIG. 7;

FIG. 9 is a fragmentary side elevational view taken substantially in the direction of arrows 9—9 of FIG. 8;

FIG. 10 is a perspective view of the security drive of FIGS. 7–9 as applied to a nut;

FIG. 11 is an end elevational view of the embodiment of FIG. 10;

FIG. 12 is a side elevational view, partially in cross section, taken along line 12—12 of FIG. 10;

FIG. 13 is another embodiment of the multi-tier drive on a bolt, with the multi-tier drive including protuberances in the form of lobes on certain of the tiers;

FIG. 14 is an end elevational view of the embodiment of FIG. 13;

FIG. 15 is a fragmentary cross sectional side elevational view taken substantially along line 15—15 of FIG. 14;

FIG. 16 is a perspective view of a nut having the security drive shown on the bolt of FIG. 13;

FIG. 17 is a end elevational view of the embodiment of FIG. 16;

FIG. 18 is a cross sectional view taken substantially along line 18—18 of FIG. 17;

FIG. 19 is a perspective view of another bolt embodiment having a male multi-tier drive with depressions in certain of the tier;

FIG. 20 is an end elevational view of the embodiment of FIG. 19;

FIG. 21 is a fragmentary cross sectional view taken substantially along line 21—21 of FIG. 20;

FIG. 22 is a nut embodiment having the male multi-tier drive of FIG. 19;

FIG. 23 is an end elevational view of the embodiment of FIG. 22;

FIG. 24 is a cross sectional view taken substantially along line 24—24 of FIG. 23;

FIG. 25 is a side elevational view of a key which can be used with the embodiments of FIGS. 1–6;

FIG. 26 is an end elevational view taken substantially in the direction of arrows 26—26 of FIG. 25;

FIG. 27 is a side elevational view, partially broken away of a key which can be used with the embodiments of FIGS. 7–12;

FIG. 28 is an end elevational view taken substantially in the direction of arrows 28—28 of FIG. 27;

FIG. 29 is a side elevational view, partially broken away, of a key which can be used with the embodiment of FIGS. 13–18;

FIG. 30 is an end elevational view taken substantially in the direction of arrows 30—30 of FIG. 29;

FIG. 31 is a side elevational view, partially broken away, of a key which can be used with the embodiments of FIGS. 19–24; and FIG. 32 is an end elevational view taken substantially in the direction of arrows 32—32 of FIG. 31.

DETAILED DESCRIPTION OF THE INVENTION

In FIGS. 1–3 a bolt 10 is shown having a threaded shank 11 with a frustoconical body or head 12 having a female multi-tier drive therein consisting of a small diameter cylindrical tier 13, a large diameter cylindrical tier 14, and a multi-lobed drive tier 15 centrally located between tiers 13 and 14. Each of the tiers is sufficiently shallow so as to prevent the use of standardized tools for unauthorized removal. In this respect, in a given embodiment of a bolt having a thread diameter of metric M6 or ¼"-20, the axial lengths of the tiers were as follows: Tier 13 was approximately 0.057 inches, tier 15 was approximately 0.035 inches, and tier 14 was approximately 0.078 inches. Each of these tiers was sufficiently shallow so that an unauthorized tool could not get a sufficiently tight grip in any one of the tiers so as to provide sufficient torque so as to turn bolt 10 when it was in a properly installed position.

A nut embodiment 10' of the bolt 10 is shown in FIGS. 4–6 wherein the primed numerals correspond to the unprimed numerals of FIGS. 1–3 and represent identical structure. However, the nut embodiment of FIGS. 4–6 has a threaded bore 17 to receive a bolt.

A key which can be used to drive the embodiments of FIGS. 1–6 is shown in FIGS. 26 and 27. Key 19 includes a hexagonal head 20 which can be received in the socket of a suitable tool or which can receive a wrench. Protruding outwardly from hexagonal head are three male tiers 13a, 14a and 15a which are received in the surfaces of tiers 13, 14 and 15, respectively. The meshing of complementary engaging surfaces 15 and 15a will provide the drive for turning the fasteners of FIGS. 1–6, and the cylindrical surfaces 13a and 14a will be closely located within cylindrical surfaces 13 and 14, respectively, to serve the dual function of guiding the key 19 into engagement with the multi-tier female drive and also stabilizing the engaged surfaces 15a and 15 against cocking.

In FIGS. 7–9 a security bolt 20 is shown having a threaded shank 21, a frustoconical body or head 22 and cylindrical tiers 23 and 24 protruding therefrom with a lobed drive tier 25 therebetween. Each of the tiers 23, 24 and 25 is sufficiently shallow so that it cannot be properly gripped with a wrench, and the lobed tier is sufficiently thin so that it cannot provide a sufficient surface contact for a punch. Also, the frustoconical head 22 cannot be gripped by a wrench. The dimensions of the various tiers are analogous to those described above relative to FIGS. 1–3.

A nut embodiment 20' of the bolt of FIGS. 7–9 is shown in FIGS. 10–12 wherein primed numerals represent structure which is identical to the unprimed numerals of FIGS. 7–9. However, nut fastener 20' has a threaded bore 27.

The key 29 of FIGS. 27 and 28 is used for driving the fastener of FIGS. 7–12, and it includes a hexagonal head 30 which is received in a suitable handle or which can have a wrench applied thereto. The key 29 has a plurality of tiers 23a, 24a and 25a which engage the tiers 23, 24 and 25, respectively, of FIGS. 7–9 and the tiers 23', 24' and 25', respectively, of the embodiment of FIGS. 10–12 to effect a driving relationship therewith. Here again, the lobe tiers 25 and 25a provide the driving relationship between the key and the fasteners, and the tiers 23a and 24a serve the dual function of guiding the key into proper engagement with the associated fasteners and also stabilizing the key against cocking on the very shallow lobed tier.

In FIGS. 13–15 another bolt embodiment 30 of the present invention is disclosed having a threaded shank 31, a frustoconical body or head 32 and a plurality of female tiers including tiers 33 and 34 and drive tier 35. All of these tiers are of shallow extent analogous to the extent of FIGS. 1–3. Portions of tiers 33 and 34 are cylindrical. In addition, however, tiers 33 and 34 have lobes or irregularities 36 and 38, respectively, which serve the functions of providing additional lobes for receiving torque and prevent the use of the types of tools which are inserted into a bore for applying a turning torque. By varying the circumferential placement of the lobes within their respective tiers, they can provide an infinite number of keyed combinations for turning the bolt. In this respect, assuming that each lobe can be moved in one degree increments in each of its tiers, this would provide 237,600 combinations, assuming that the lobed tier 35 was not changed. The foregoing number of combinations can also be increased by increasing the number of lobes in tiers 33 and 34 and varying their positions. It will be appreciated that irregularities in the form of splines or any other type of protuberance can be used instead of the lobe type of protuberances. Also, the female tiers can be polygonal.

A nut embodiment 30' is shown in FIGS. 16–18 wherein primed numerals corresponding to the unprimed numerals of FIGS. 13–15 represent identical elements of structure. In addition the nut embodiment 30' has a threaded bore 37.

A key 39 is shown in FIGS. 29 and 30 for turning the fasteners of FIGS. 13–18, and it includes a hexagonal head 40 which can be inserted into a suitable socket of a handle or which can have a wrench applied thereto. Key 39 includes a plurality of tiers 33a, 34a and 35a which are placed in engagement with tiers 33, 34 and 35, respectively, of FIGS. 13–15 and the tiers 33', 34' and 35', respectively, of FIGS. 16–18. Additionally, the male tiers 33a and 34a have depressions 36a and 38a which receive lobes or irregularities 36 and 38 of FIGS. 13–15 or lobes 36' and 38' of FIGS. 16–18. The tiers 33 and 34 of FIGS. 13–15 and the tiers 33' and 34' of FIGS. 16–18 have the functions of guiding the key 39 into position and stabilizing it after it has been fully positioned by preventing cocking of the key.

In FIGS. 13–15 lobes or irregularities 36 and 38 are shown on both tiers 33 and 34, respectively, and in FIGS. 16–18 lobes or irregularities 36' and 38' are shown on both tiers 33' and 34', respectively. However, it will be appreciated that there can be an embodiment with only one lobe on one of the tiers, or there can be an embodiment with only one lobed tier such as 35 or 35' and only one additional tier having a lobe or irregularity thereon. Additionally, in an embodiment of the foregoing type having only two tiers, such an embodiment should have an index of at least 0.625, as defined hereafter. In FIGS. 19–21 another multi-tier fastener 40 in the nature of a bolt is shown which includes a threaded shank 41, a head or body 42 and a multi-tier male drive on body 42 consisting of tiers 43, 44 and lobed drive tier 45. There are depressions or irregularities 46 and 48 in cylindrical tiers 43 and 44, respectively. The depressions can be of any suitable shape. The tiers 43, 44 and 45 are shallow and they have the dimensions substantially as described above relative to FIGS. 1–3. The depressions 46 and 48 provide additional torque-receiving surfaces and can have their positions varied to provide additional key-receiving configurations.

In FIGS. 22–24 a nut embodiment 40' is shown wherein the primed numerals correspond to the structure of the unprimed numerals of FIGS. 19–21. In addition, the nut embodiment 40' has a threaded bore 47.

A key 49 for turning the fastener embodiments of FIGS. 19–24 is shown in FIGS. 31 and 32. Key 49 includes a hexagonal head 50 which can be mounted in a suitable handle or which can receive a wrench. Key 49 includes tiers 43a, 44a and 45a which mate with tiers 43, 44 and 45, respectively, of the embodiment of FIGS. 19–21 and the tiers 43', 44' and 45', respectively, of the embodiment of FIGS. 22–24. Additionally, lobes 46a and 48a enter irregularities or depressions 46 and 48 of FIGS. 19–21 and 46' and 48' of FIGS. 22–24. The tiers 43 and 44 serve the functions of guiding the key 49 into position and stabilizing it after it has been fully positioned, in addition to performing the other above described functions.

In FIGS. 19–21 depressions or irregularities 46 and 48 are shown on both tiers 43 and 44, respectively, and in FIGS. 22–24 depressions or irregularities 46' and 48' are shown on both tiers 43' and 44', respectively. However, it will be appreciated that there can be an embodiment with only one depression on one of the guiding and stabilizing tiers. Also there can be an embodiment with only one lobed tier such as 45 or 45' and only one additional tier having a depression or irregularity thereon. Additionally, in an embodiment of the foregoing type having only two tiers, such an embodiment should have an index of at least 0.625, as defined hereafter.

In the embodiments of FIGS. 13–24 the guiding and stabilizing tiers are shown with each having a single irregularity in the nature of a lobe or depression. However, if desired each of these tiers may have multiple irregularities in the nature of lobes or other types of protuberances or depressions or combinations thereof.

While all of the embodiments have shown the lobed drive tier located between the two guiding and stabilizing tiers, it will be appreciated that they can be oriented with the guiding and stabilizing tiers adjacent each other in certain instances.

In all of the above multi-tier drive embodiments, the outer configuration of the body or head of the bolts and the outer configuration of the nuts is frustoconical, and thus cannot be satisfactorily gripped with a wrench.

For satisfactory operation of a security fastener having only a curvilinear groove or ridge, there must be an index of between about 0.625–1.0, which is the ratio of the axial length of the ridge or groove to its diameter. The same index must be realized when there are a plurality of tiers, as in the present situation, and this index is the sum of the individual ratios of the axial length of each tier to its diameter. In each of the multi-tier fasteners of FIGS. 1–24 there is an index of between about 0.625 and 1.0 which is the total of the ratios of each axial length of each tier to its diameter. For example, in FIGS. 1–6 the axial length of tier 13 is 0.057 inches; the axial length of tier 14 is 0.078 inches; and the axial length of tier 15 is 0.035 inches. The diameter of tier 13 is 0.188 inches; the diameter of tier 14 is 0.374 inches and the diameter of tier 15 is 0.307 inches. Thus, the ratio of the length to diameter of tier 13 is 0.057/0.188 or 0.302; the ratio of the length to the diameter tier 14 is 0.078/0.374 or 0.209; and the ratio of the length of diameter of tier 15 is 0.035/0.307 or 0.114. The sum of the individual ratios of each length to the diameter of each tier is therefore an index of 0.302 +0.209 +0.114 or 0.625. As noted above, for satisfactory operation there should be an index of between about 0.625 and 1.0.

It can thus be seen that the multi-tier drives associated with the above-described fasteners are manifestly capable of achieving the above-enumerated objects, and while preferred embodiments of the present invention have been disclosed, it will be appreciated that it is not limited thereto but may be otherwise embodied within the scope of the following claims.

I claim:

1. A multi-tier security fastener comprising a body having a longitudinal axis, a first tier on said body, a drive pattern on said first tier, said drive pattern being located on a first surface extending in an axial direction relative to said longitudinal axis, second and third key-receiving tiers on said body axially spaced from said first tier, second and third key-receiving surfaces on said second and third key-receiving tiers, respectively, extending in axial directions relative to said longitudinal axis, said first and second and third tiers having an index of between about 0.625 and 1.0 which is the sum of the ratios of the axial length to diameter of each tier.

2. A multi-tier security fastener as set forth in claim 1 wherein said second and third tiers include at least a portion which is a part of a cylindrical surface.

3. A multi-tier security fastener as set forth in claim 2 including a key-receiving irregularity extending in an axial direction in at least said second surface.

4. A multi-tier security fastener as set forth in claim 1 wherein said second and third surfaces are cylindrical.

5. A multi-tier security fastener as set forth in claim 1 including a key-receiving irregularity extending in an axial direction in at least said second surface.

6. A multi-tier security fastener as set forth in claim 5 including a second key-receiving irregularity on said third surface.

7. A multi-tier security fastener as set forth in claim 6 wherein said first tier is located between said second and third tiers.

8. A multi-tier security fastener as set forth in claim 5 wherein said first tier is located between said second and third tiers.

9. A multi-tier security fastener as set forth in claim 8 wherein said second and third tiers include cylindrical portions.

10. A multi-tier security fastener as set forth in claim 1 wherein said first tier is located between said second and third tiers.

11. A multi-tier security fastener as set forth in claim 1 wherein said body has an outer frustoconical configuration radially outwardly of said first, second and third tiers.

12. A multi-tier security fastener as set forth in claim 1 including a key having fourth, fifth and sixth surfaces for engaging said first, second and third key-receiving surfaces, respectively.

13. A multi-tier security fastener as set forth in claim 12 wherein said fourth surface engages said first surface in complementary engaging relationship.

14. A multi-tier security fastener as set forth in claim 13 wherein said fifth and sixth surfaces engage said second and third surfaces, respectively, in guiding and stabilizing relationship.

15. A multi-tier security fastener as set forth in claim 14 including mating irregularities between at least said second and fifth surfaces.

16. A multi-tier security fastener as set forth in claim 1 including a key having fourth and fifth, surfaces for engaging said first and second surfaces, respectively.

17. A multi-tier security fastener as set forth in claim 16 wherein said fourth surface engages said first surface in complementary engaging relationship.

* * * * *